United States Patent
Ota et al.

(10) Patent No.: US 8,846,173 B2
(45) Date of Patent: Sep. 30, 2014

(54) OPTICAL RECORDING MEDIUM AND MANUFACTURING METHOD OF OPTICAL RECORDING MEDIUM

(71) Applicant: Sony Corporation, Tokyo (JP)

(72) Inventors: Yo Ota, Kanagawa (JP); Shigeki Takagawa, Kanagawa (JP); Hiroshi Uchiyama, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/914,299

(22) Filed: Jun. 10, 2013

(65) Prior Publication Data

US 2014/0011039 A1     Jan. 9, 2014

(30) Foreign Application Priority Data

Jul. 9, 2012    (JP) .................................. 2012-153354
May 9, 2013    (JP) .................................. 2013-099278

(51) Int. Cl.
    *G11B 7/24*         (2013.01)
    *G11B 7/243*       (2013.01)
    *G11B 7/24035*    (2013.01)

(52) U.S. Cl.
CPC ............ *G11B 7/24035* (2013.01); *G11B 7/243* (2013.01); *G11B 2007/24306* (2013.01)
USPC ...................... 428/64.1; 428/64.4; 430/270.12

(58) Field of Classification Search
CPC ....................................................... G11B 7/243
USPC ........................................................ 428/64.4
See application file for complete search history.

(56) References Cited

U.S. PATENT DOCUMENTS 4,865,948 A * 9/1989 Masumoto et al. ...... 430/270.11

FOREIGN PATENT DOCUMENTS

JP     2011-042070     3/2011
JP     2011-065722     3/2011

* cited by examiner

*Primary Examiner* — Elizabeth Mulvaney
(74) *Attorney, Agent, or Firm* — K&L Gates LLP (57) ABSTRACT

There is provided an optical recording medium including a substrate, an information recording layer that is formed on the substrate and has a single film structure formed by an oxide including W and Ru, and a light transmissive layer that is formed on the information recording layer.

12 Claims, 10 Drawing Sheets

OPTICAL RECORDING MEDIUM AND MANUFACTURING METHOD OF OPTICAL RECORDING MEDIUM

CROSS REFERENCES TO RELATED APPLICATIONS

The present application claims priority to Japanese Priority Patent Application JP 2012-153354 filed in the Japan Patent Office on Jul. 9, 2012, and JP 2013-099278 filed in the Japan Patent Office on May 9, 2013, the entire content of which is hereby incorporated by reference.

BACKGROUND

The present disclosure relates to an optical recording medium and a manufacturing method thereof.

In recent years, in an optical disc which is one of optical information recording type media, high density recording and large capacity have progressed with the widespread use of personal computers, the start and widespread use of digital terrestrial broadcasting, and the acceleration of the widespread use of high-vision televisions in ordinary homes. For example, a CD (Compact Disc), a DVD (Digital Versatile Disc), the Blu-ray Disc (BD) (registered trademark), and optical disc recording media which can record more information have been provided. Further, a disc which realizes higher density recording than the current BD has been proposed and developed as a recent next generation optical disc.

Japanese Unexamined Patent Application Publication Nos. 2011-42070 and 2011-65722 are examples of the related art.

SUMMARY

In this optical disc field, efficiency of manufacturing steps or cost-down are strongly desired. For example, in the current Blu-ray Disc, an information recording layer has a multi-film structure including a recording film, a reflective film, a dielectric film, and the like, and thus a large-scale sputtering device is necessary. In other words, if the information recording layer is formed using a multi-layer film, a certain time is necessary to form the multi-layer film, and a high-priced film forming device including several film forming chambers is necessary. From the viewpoint of manufacturing efficiency or costs, a simple information recording layer such as a single film structure is preferable. In addition, a multi-layer disc having a plurality of information recording layers has been studied as a next generation disc, the number of information recording layers increases, and thereby the information recording layer is necessary to have a simpler structure.

However, in a case where the information recording layer has a single film structure, reliability thereof may be insufficient. For example, an information recording layer in the related art has a structure in which a recording film is interposed between protective films such as a dielectric, and the protective films (in terms of optics, mechanics, and thermal conduction) such as a dielectric have a function of suppressing a mark portion from expanding when the mark is formed at a high-level laser power. In a single film structure in which the dielectric or the like is not provided, this function does not work, and, as a result, it is difficult to secure a laser power margin. In addition, it is necessary to perform recording (forming marks) at some high-level laser power in order to obtain a degree of modulation of a reproduction signal; however, there is a case where cross light between marks occurs due to the above-described expansion. This hinders high density. For example, it is difficult to perform recording on information recording layers at a recording density of 30 GB or more for each layer.

An embodiment of the present disclosure has been made in light of the above-described, and thus there is provided an optical recording medium of which an information recording layer has a simple single-film layer and reliability is favorable so as to handle high density recording.

According to an embodiment of the present disclosure, there is provided an optical recording medium including a substrate, an information recording layer that is formed on the substrate and has a single film structure formed by an oxide including W and Ru, and a light transmissive layer that is formed on the information recording layer.

According to an embodiment of the present disclosure, there is provided a method of manufacturing an optical recording medium which includes a substrate, an information recording layer, and a light transmissive layer, the method including forming the substrate, forming the information recording layer which has a single film structure formed by an oxide including W and Ru through sputtering on the substrate, and forming the light transmissive layer on the information recording layer.

According to the embodiments of the present disclosure, the information recording layer has a single film structure formed by an oxide including W and Ru. With this structure, it is possible to secure a sufficient laser power margin and handle high density recording as compared with a single film layer in the related art.

According to the embodiments of the present disclosure, it is possible to provide an optical recording medium of which an information recording layer has a simple single-film layer and reliability is favorable so as to handle high density recording.

Additional features and advantages are described herein, and will be apparent from the following Detailed Description and the figures.

DETAILED DESCRIPTION

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an embodiment will be described in the following order.

<1. Structure of optical disc according to embodiment>
<2. Manufacturing procedures>
<3. Characteristics according to information recording layer component>
  [3-1: Component ratio in measurement]
  [3-2: Power margin]
  [3-3: Reliability verification]
  [3-4: Handling of optical recording density]
  [3-5: Conclusion, and Sn addition concentration and Ru concentration]

<1. Structure of Optical Disc According to Embodiment>

Figure 1:
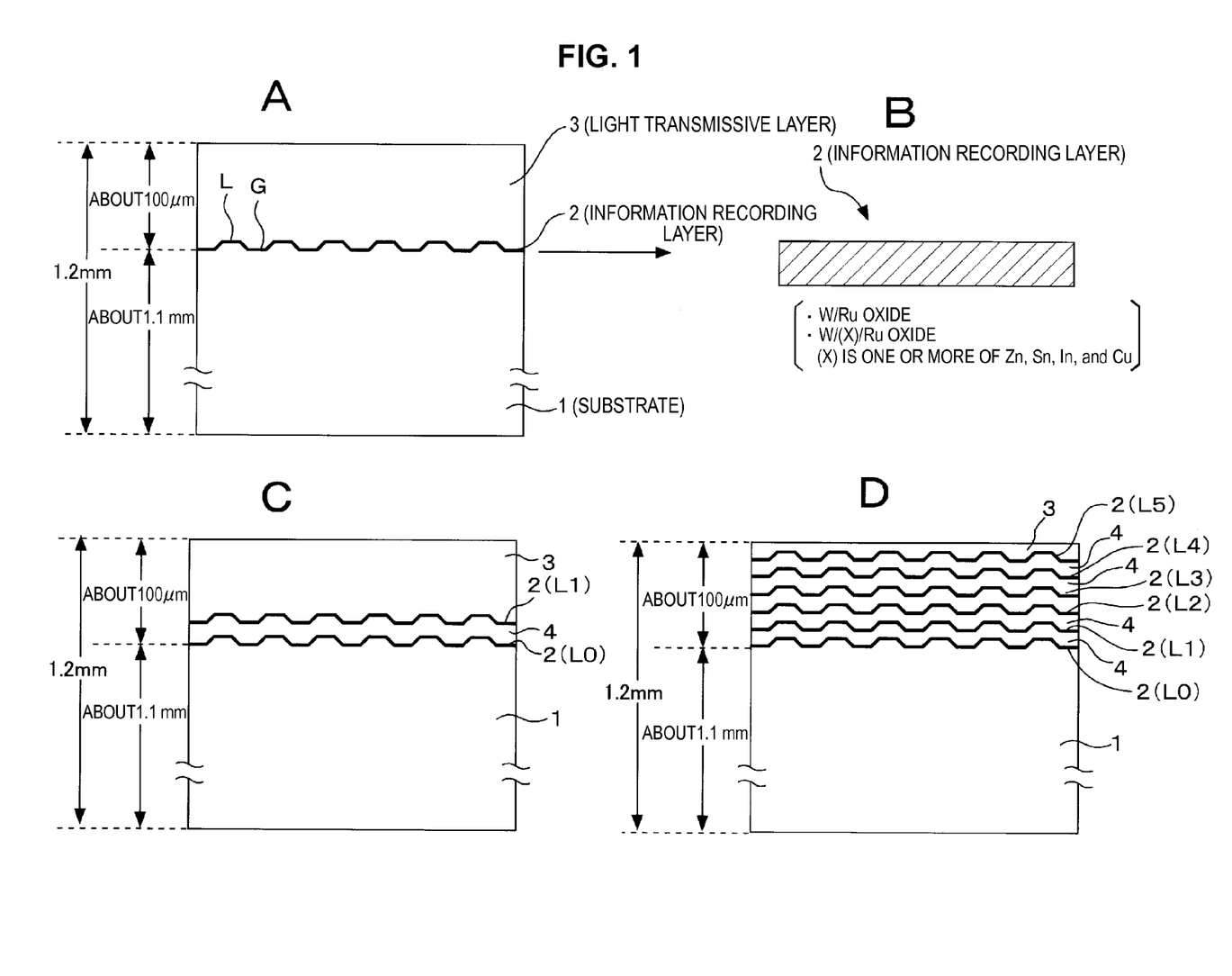
FIGS. 1A to 1D are diagrams illustrating layer structures of an optical disc of an embodiment of the present disclosure.

With reference to FIGS. 1A to 1D, a layer structure of an optical disc according to the embodiment will be described. FIG. 1A schematically shows a layer structure of an optical disc with a single layer (an information recording layer is a single layer) according to the embodiment. In the optical disc of this example, an information recording layer 2 and a light transmissive layer (cover layer) 3 are formed on one surface side of a disk-shaped substrate 1 which is, for example, about 1.1 mm thick and about 120 mm in outer diameter. In addition, in the figures, the upper side is a laser incident surface to which laser light is incident during recording and reproduction.

The substrate 1 is formed, for example, by injection molding of a polycarbonate resin. At this time, a stamper to which a concave-and-convex shape of wobbling grooves for tracking is transferred from a mastering disk is disposed in a die, and thereby the substrate 1 is formed in a state where the concaves and convexes of the stamper are transferred thereto. In other words, the substrate 1 provided with the wobbling grooves which are recording tracks is formed through injection molding.

The information recording layer 2 is formed on one surface of the substrate 1, that is, the surface on which the concaves and convexes which are wobbling grooves are formed. In a case of this example, the information recording layer 2 has a single-film structure. As shown in FIG. 1B, the information recording layer 2 is a thin film of an oxide including W (tungsten) and Ru (ruthenium). The film thickness is, for example, about 40 nm. Alternatively, as indicated by W/(X)/Ru, the information recording layer 2 is an oxide to which other elements are added in addition to W and Ru. X is any one of Zn (zinc), Sn (tin), In (indium) or Cu (copper), or combinations thereof.

In addition, in the information recording layer 2, the Ru content ratio is smaller than 30% when elements other than Ru are set to 100. In other words, in a case of using a W/Ru oxide, the Ru content ratio is smaller than 30% when W is set to 100. Alternatively, in a case of using W/(X)/Ru oxide, the Ru content ratio is smaller than 30% when W+(X) is set to 100. In addition, in a case where (X) of the information recording layer 2 is Sn, when W+Sn is set to 100, the Sn content ratio is smaller than 70%. Further, an amount of oxygen is contained more than in the stoichiometric composition in the W/Ru oxide or the W/(X)/Ru oxide. In other words, the oxide is in a state of being equal to or higher than complete oxidation.

As shown in FIG. 1A, the upper surface (the laser irradiation surface side) of the information recording layer 2 is the light transmissive layer 3. The light transmissive layer 3 is formed so as to protect the optical disc. Recording and reproduction of an information signal are performed, for example, by collecting laser light on the information recording layer 2 through the light transmissive layer 3. The light transmissive layer 3 is formed, for example, by spin-coating an ultraviolet-ray curable resin and curing the resin through irradiation with ultraviolet rays. Alternatively, the light transmissive layer 3 may be formed using an ultraviolet-ray curable resin and a polycarbonate sheet, or an adhesive layer and a polycarbonate sheet. The light transmissive layer 3 is about 100 μm thick, and the entire optical disc is about 1.2 mm thick along with the substrate 1 of about 1.1 mm thick.

In addition, although not shown, there may also be cases where a hard coat is formed on the surface (laser irradiation surface) of the light transmissive layer 3 in order to protect the optical disc from mechanical shocks thereon or damages and to protect recording and reproduction quality of information signal from attachment of fingerprints thereto when handled by a user. As the hard coat, an ultraviolet-ray curable resin with which a fine powder of silica gel for improving a mechanical strength is mixed may be used, or an ultraviolet-ray curable resin such as a solvent type or a solventless type may be used. The hard coat is made to have the thickness of 1 μm to several μm so as to have a mechanical strength and repel oil and fat such as fingerprints.

FIGS. 1C and 1D show a case of a so-called multi-layer disc. FIG. 1C shows a dual layer disc in which layers L0 and L1 are provided as the information recording layer 2. FIG. 1D shows a six-layer disc in which layers L0, L1, L2, L3, L4 and L5 are provided as the information recording layer 2. An intermediate layer 4 is interposed between the information recording layers 2. Although the dual layer disc and the six-layer disc have been exemplified here, the number of information recording layers 2 may be diversified.

<2. Manufacturing Procedures>

Figure 2:
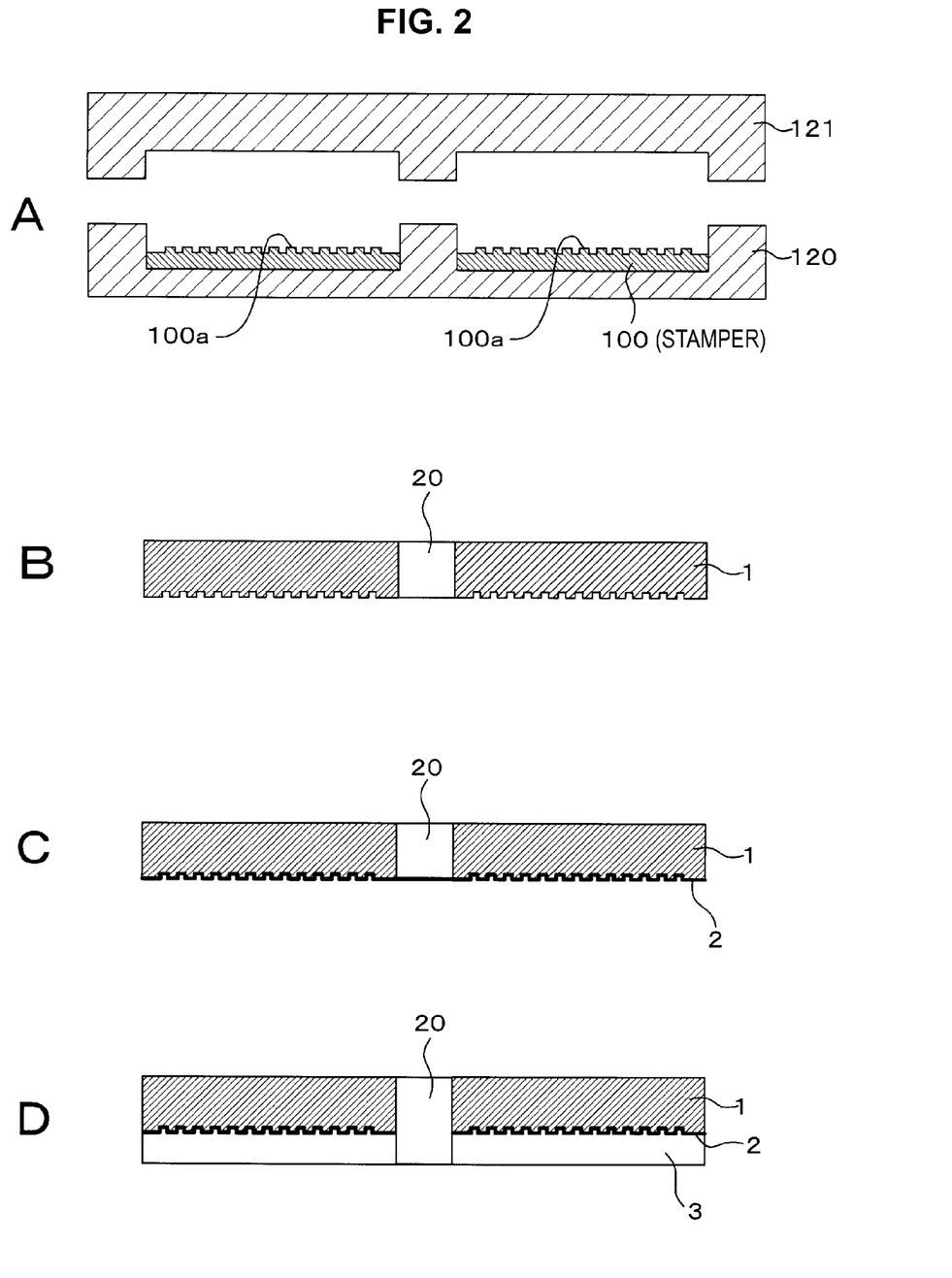
FIGS. 2A to 2D are diagrams illustrating manufacturing steps of the optical disc of the embodiment.
Figure 3:
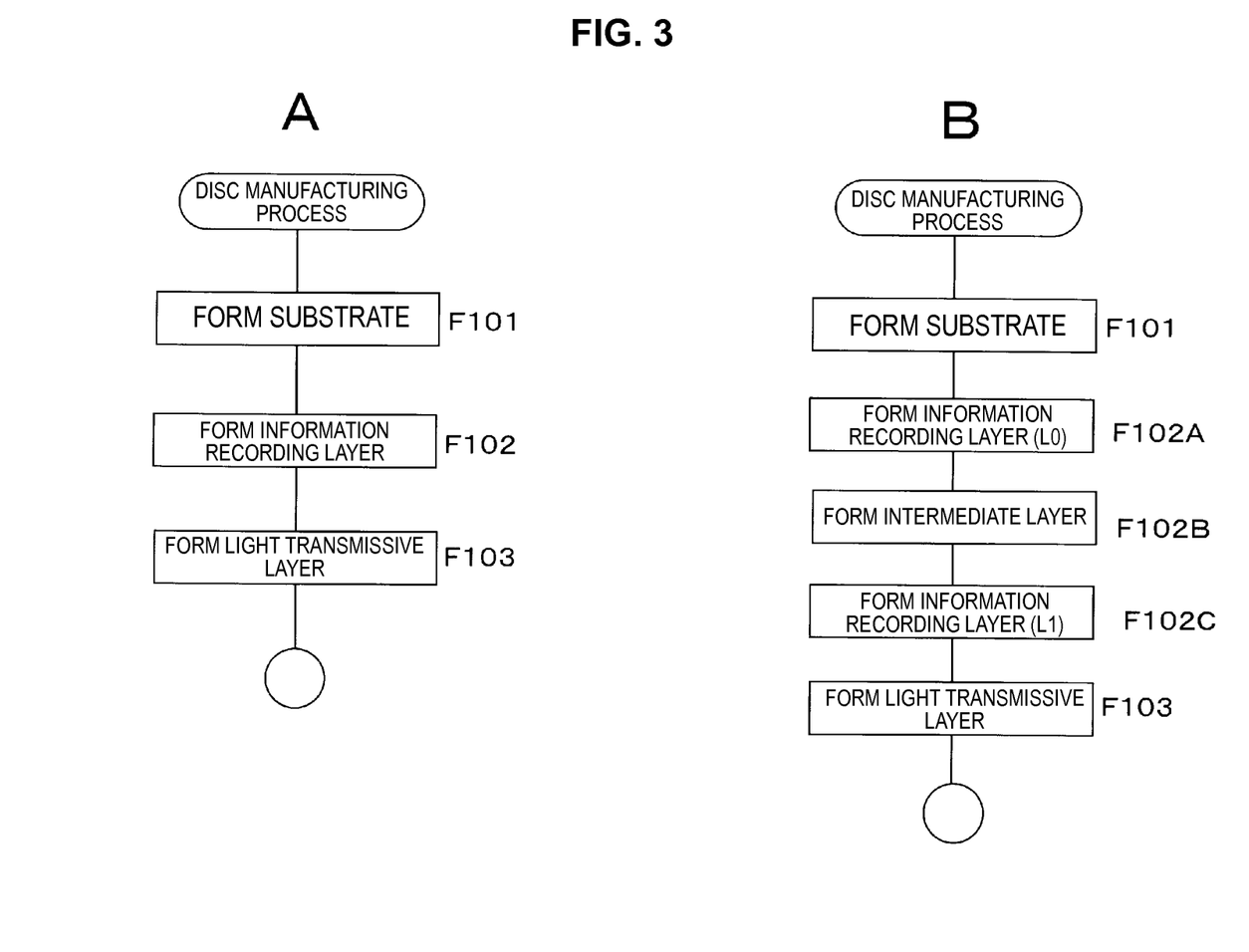
FIGS. 3A and 3B are flowcharts illustrating manufacturing steps of the optical disc of the embodiment.
Figure 4:
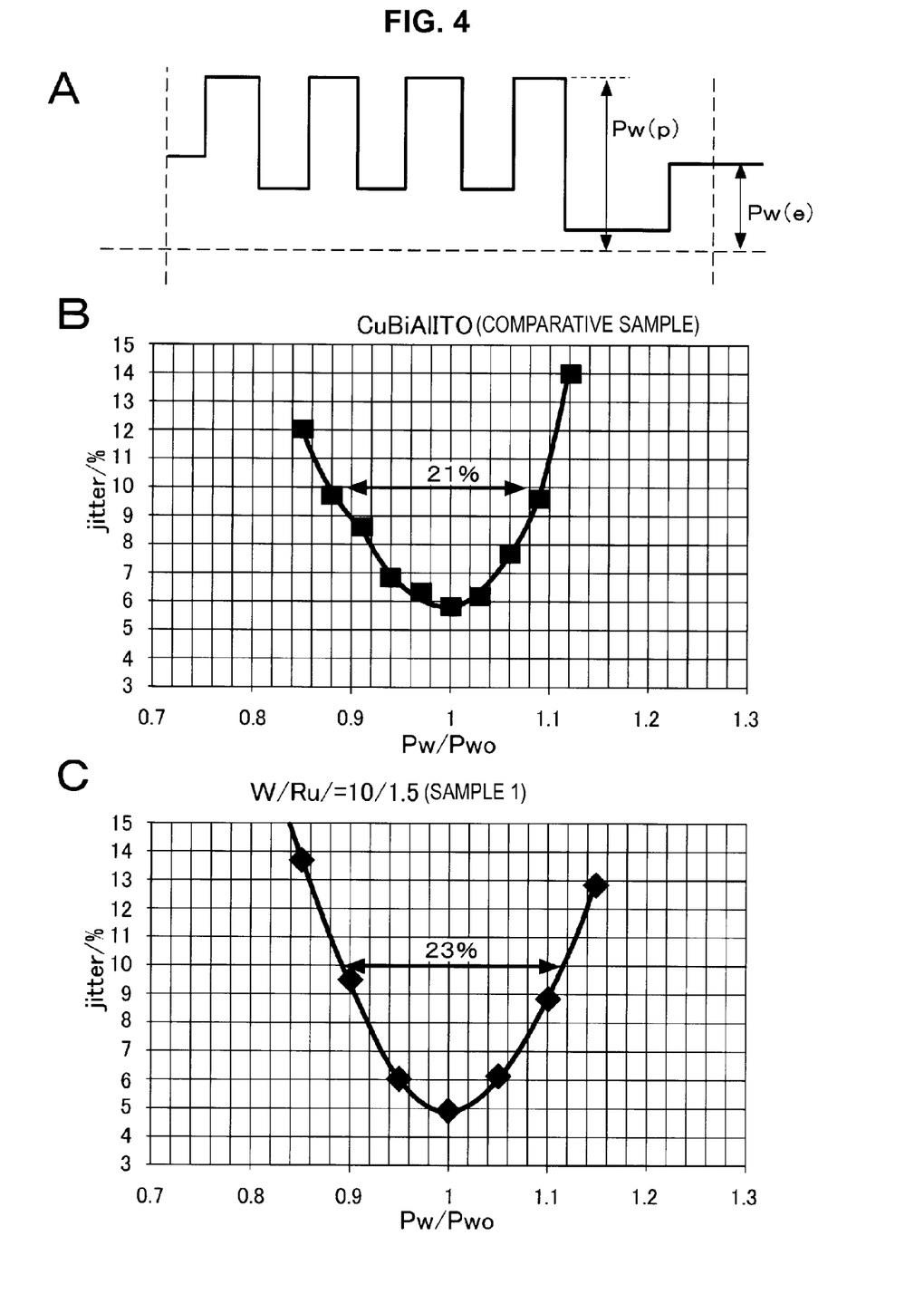
FIGS. 4A to 4C are diagrams illustrating power margins in a comparative example and the embodiment.
Figure 5:
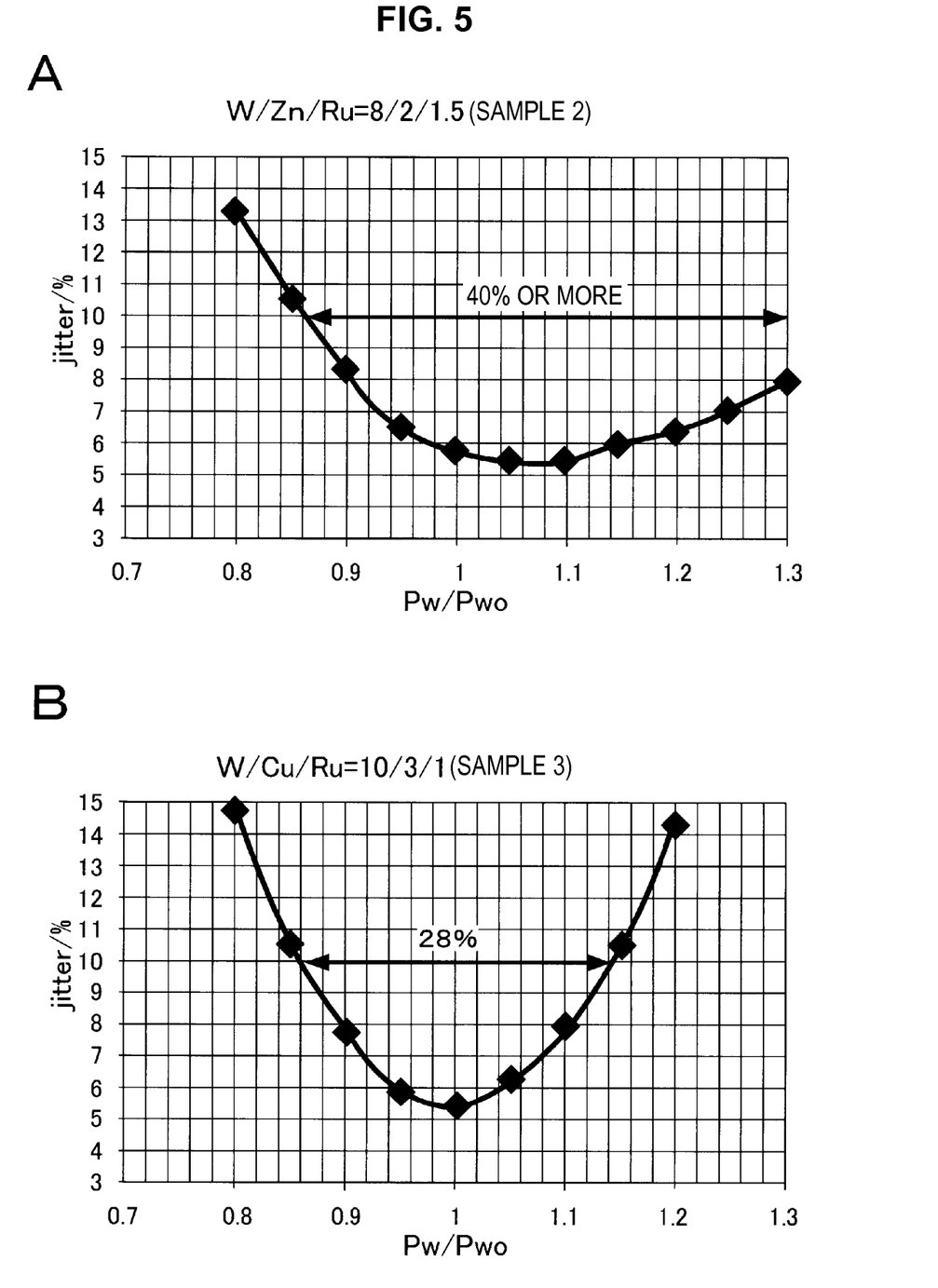
FIGS. 5A and 5B are diagrams illustrating a power margin of the embodiment.
Figure 6:
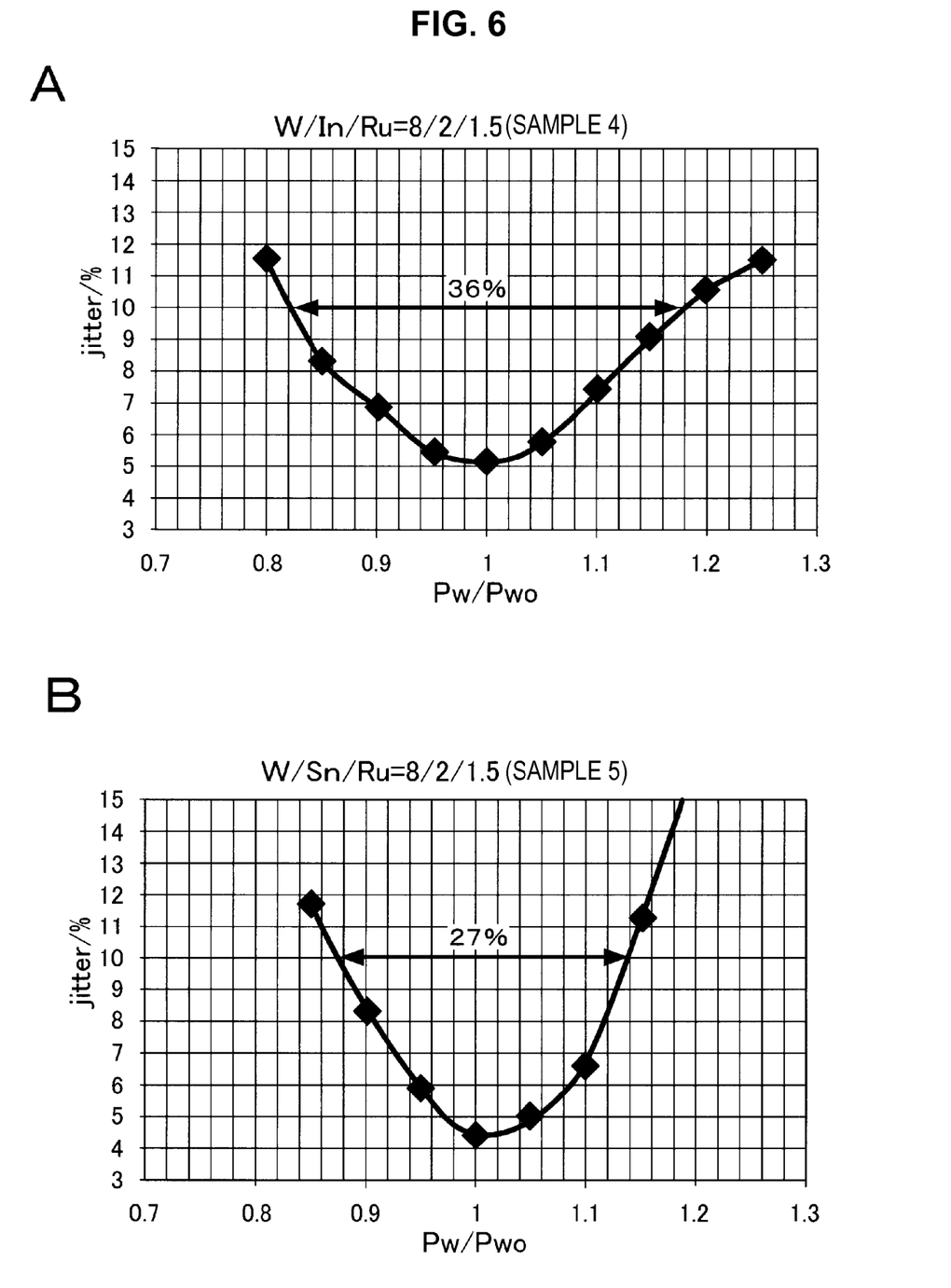
FIGS. 6A and 6B are diagrams illustrating a power margin of the embodiment.

For example, a description will be made of manufacturing procedures of the optical disc according to the embodiment by exemplifying the single layer structure shown in FIG. 1A. FIGS. 2A to 2D are schematic diagrams illustrating manufacturing procedures of the optical disc, and FIG. 3A is a flowchart illustrating a manufacturing process. In addition, here, a description is made from a step of creating the substrate 1 using a stamper, but the stamper is formed through processes including disk mastering, developing, and stamper generation preceding this step.

The substrate 1 is formed in step F101 of FIG. 3A. For example, the molded resin substrate 1 is formed through injection molding of a polycarbonate resin. Here, concave-and-convex patterns which are recording tracks (wobbling grooves) of the information recording layer 2 are formed in the molded substrate 1. FIG. 2A schematically shows a die for molding the substrate 1. The die includes a lower cavity 120 and an upper cavity 121, and a stamper 100 which transfers the concave-and-convex patterns to the information recording layer 2 is disposed in the lower cavity 120. The concave-and-convex patterns 100a for transfer are formed on the stamper 100.

The substrate 1 is molded in the injection molding by using the die, and the molded substrate 1 is as shown in FIG. 2B. In other words, the substrate 1 made of a polycarbonate resin has a center hole 20 at the center thereof and concave-and-convex patterns at one side thereof. The concave-and-convex patterns are formed by transferring the concave-and-convex patterns 100a formed on the stamper 100 in the die.

Subsequently, in step F102 of FIG. 3A, the information recording layer 2 is formed. In other words, the information recording layer 2 is formed on the concave-and-convex patterns of the substrate 1 through sputtering. FIG. 2C shows the state in which the information recording layer 2 is formed. In this case, the above-described W/Ru alloy or W/(X)/Ru alloy is used as a sputtering target. In addition, an Ar gas or an $O_2$ gas is introduced so as to perform reactive sputtering. Thereby, the information recording layer 2 of a W/Ru oxide or a W/(X)/Ru oxide described with reference to FIGS. 1A to 1D is formed (as described above, X is any one of Zn, Sn, In, and Cu, or a combination thereof). In addition, in this step, reactive co-sputtering may be performed in which a W target, and a Ru target (and a (X) target) are independently used, and a sputtering power is set separately.

When the information recording layer 2 is formed in this way, the light transmissive layer 3 is formed in step F103 of FIG. 3A. For example, an ultraviolet-ray curable resin is made to be spread on the surface where the information recording layer 2 is formed as shown in FIG. 2C through spin coating, and is irradiated with ultraviolet rays such that the resin is cured. Thereby, the light transmissive layer 3 is formed as shown in FIG. 2D. Subsequently, a hard coat may be formed on the surface of the light transmissive layer 3. In addition, a printing process is performed on the surface (label surface) of the substrate 1 side. Further, an optical disc, for example, a recordable disc is completed through inspection.

FIG. 3B shows a manufacturing process of the dual layer disc shown in FIG. 1C. In the same manner as in the case of the single layer disc of FIG. 3A, after a substrate is formed (F101), an information recording layer is formed as a layer L0 (F102A), an intermediate layer is formed (F102B), an information recording layer is formed as a layer L1 (F102C), and then a light transmissive layer is formed (F103). In forming the information recording layers in steps F102A and F102C, a W/Ru alloy or a W/(X)/Ru alloy is used as a target, and an Ar gas or an $O_2$ gas is introduced so as to perform reactive sputtering (or reactive co-sputtering). In forming the intermediate layer in step F102B, for example, an ultraviolet-ray curable resin is made to be spread through spin coating and is irradiated with ultraviolet rays such that the resin is cured, thereby forming the intermediate layer.

In these steps of FIG. 3B, the dual layer disc according to the embodiment can be manufactured. In addition, although not described, in a case of an optical disc with three or more layers such as the six-layer disc of FIG. 1D, the steps of forming an information recording layer and an intermediate layer are repeatedly performed a necessary number of times. Further, in a multi-layer disc of two or more layers, a composition ratio may be different for each information recording layer 2 (L0, L2, L2, . . . , and Ln). For example, as described later, a transmittance varies depending on the Ru content. The more Ru, the further reduced the transmittance. In a case of the multi-layer disc, the information recording layers 2 located toward the front side when viewed from the laser incident surface is necessary to have the higher transmittance, and thus the Ru content ratio also preferably decreases toward the layer Ln located on the frontmost side from the layer L0 located on the innermost side.

The optical recording medium is manufactured in the above-described way, and thereby it is possible to maintain reliability while realizing improvement in manufacturing efficiency or cost-down, and to thereby provide a high density optical recording medium. To manufacture the optical recording medium with a single sputtering chamber has a significant effect of realizing cost-down. In other words, the information recording layer 2 has a single film structure, and can realize improvement in sputtering efficiency or cost-down.

<3. Characteristics According to Component of Information Recording Layer>

Hereinafter, a description will be made of characteristics according to a component of the information recording layer, derived from a variety of measurement results when the information recording layer 2 is formed using a W/Ru oxide or a W/(X)/Ru oxide.

In addition, jitter, the modulation, and asymmetry described in each measurement are generally used as indexes for evaluating a signal. Generally, reproduction of an optical disc employs a method of irradiating a disc with semiconductor laser light and detecting returning light from it. Signal characteristics are evaluated by accurately reproducing a recorded digital signal. For example, in the Blu-ray Disc, when reproducing the disc, the disc rotates at a linear velocity of 4.92 msec, is regulated to have 1 clock of 15.15 ns, and is formed by pits and spaces 2T to 8T (30.30 ns to 121.20 ns) (T indicates a channel clock cycle). The jitter represents deviation from regular clock by σ/T using a standard deviation σ and 1T. It can be said that the larger the value of the jitter is, the more deteriorated the reproduction signal becomes.

The modulation is expressed by (18H−18L)/(18H). "18H" is a peak level of a reproduced RF signal waveform of an 8T pattern, "12H" is a peak level of a 2T pattern, "12L" is a bottom level of the 2T pattern, and "18L" is a bottom level of the 8T pattern. The modulation expressed by the above expression is a magnitude of the 8T amplitude and an index which depends on a depth of the 8T pit. It can be said that a C/N ratio becomes higher as the value of the modulation increases.

The asymmetry is expressed by {(18H+18L)−(12H+12L)}/{2(18H−18L)} and indicates a deviation of center axes of the 8T signal and the 2T signal. This asymmetry is an important index for determining a threshold for binarization. In the Blu-ray Disc, the asymmetry is specified to be −10% to 15%. A value of the asymmetry is a signal obtained by differentiating the sizes of the long pit (for example, 8T pit) and the 2T pit, but is largely affected by a minimal change in sizes of marks so as to cause a fluctuation.

[3-1: Component Ratio in Measurement]

As the optical disc which is a measurement sample, a component ratio of the information recording layer 2 was set as follows.

Sample 1: W/Ru=10/1.5
Sample 2: W/Zn/Ru=8/2/1.5
Sample 3: W/Cu/Ru=10/3/1
Sample 4: W/In/Ru=8/2/1.5
Sample 5: W/Sn/Ru=8/2/1.5

In addition, the ratio shown in each sample is accurately not a content concentration ratio in a single film which is the information recording layer 2 but a film thickness ratio which is set when co-sputtering is performed so as to form a film. A description will be made of a method of forming a film through co-sputtering by exemplifying W/Sn/Ru=8/2/1.5 of Sample 5.

(Procedure 1)

Gas flow rates were fixed to Ar=30 sccm and $O_2$=50 sccm, and a film forming rate of each of W, Sn and Ru was obtained. A film of W was formed on a Si wafer at a sputtering power of 400 W for 1000 sec, a step difference between a surface on which the film was formed and a surface on which the film was not formed was measured with a step difference measuring instrument, so as to obtain a film thickness. The film thickness was 263 nm. Similarly, a film of Sn was formed at 350 W for 1000 sec, and a film of Ru was formed at 400 W for 1000 sec. The film thickness of Sn was 290 nm, and the film thickness of Ru was 185.5 nm.

(Procedure 2)

The sputtering power of W is fixed to 400 W, and a sputtering power of Sn is roughly estimated so as to become W/Sn=8/2 for the same film forming time. In order to form a film at a ratio of Sn of "2" with respect to W of "8", it is necessary to form a film of Sn at a sputtering power of 263 (nm)×(2/8)×350(W)/290(nm)=79 W. Similarly, in order to form a film of Ru at a ratio of W/Ru=8/1.5, it is necessary to form a film of Ru at a sputtering power of 263(nm)×(1.5/8)× 400(W)/185.5(nm)=106 W. In this above-described way, the power for forming each target is obtained.

(Procedure 3)

Time for forming an aimed film thickness is roughly estimated. Since W is preferably included at a ratio of 8 to the entirety (8+2+1.5=11.5) in a compound after co-sputtering, if a film thickness is aimed at 45 nm with the compound after co-sputtering, the time for W corresponds to 45(nm)×(8/11.5)=31.3(nm). Since the time necessary to form a W film of 31.3 nm is the overall film forming time, 31.3(nm)×1000 (sec)/263(nm)=119 sec, and thus a roughly estimated time is set to 119 sec.

(Procedure 4)

A deviation between the roughly estimated time (119 sec) and an actual co-sputtering film forming time is adjusted. A time obtained from a rate of a simple substance and a rate during co-sputtering are slightly deviated, and thus a rate is determined through practical co-sputtering. A film thickness was 48 nm when co-sputtering was performed for the roughly estimated time 119 sec. Therefore, the time for forming a film thickness of 45 nm with respect to 48 nm was 112 sec. In the above-described way, the information recording layer 2 with the film thickness ratio of W/Sn/Ru=8/2/1.5 and the film thickness of 45 nm was formed.

W/Sn/Ru=8/2/1.5 of Sample 5 is a film thickness ratio in the above-described film forming process, and this is also the same for the other Samples 1 to 4. In addition, as a result of analysis using an SEM-EDX (Scanning Electron Microscope-Energy Dispersive X-ray Detector), the practical component ratio of Sample 5 was W:Sn:Ru:=90.8:9.2:11.6, that is, approximately W/Sn/Ru=9/1/1.

[3-2: Power Margin]

A description will be made of a power margin derived from jitter measurement in FIGS. 4A to 6B in relation to the above-described respective Samples 1 to 5, and a comparative sample. Measurement conditions are as follows.

Linear density: 25 GB (a recording linear density of a capacity of 25 GB per layer)

Track pitch: 0.32 μm (a groove pitch due to groove recording)

Recording linear velocity: 4.92 msec (corresponding to a velocity of the BD)

Light strategy: laser output by (n−1) strategy pulses

In addition, (n−1) strategies are a laser driving waveform generation method in which (n−1) pulses are used as laser driving pulses, for example, with respect to n Tmarks. FIG. 4A shows an example of a laser driving pulse waveform. This corresponds to a laser driving pulse when 5 Tmarks are formed, and includes four pulses. In addition, peak power Pw(p) and erasure power Pw(e) described later are levels of the shown parts in the strategy waveform.

FIG. 4B shows a jitter measurement result of an optical disc in which the information recording layer 2 of an ITO-based single film (CuBiAlITO) is formed as a comparative example, and FIGS. 4C, 5A, 5B, 6A and 6B respectively show jitter measurement results of Samples 1 to 5 of the embodiment. The longitudinal axis of each figure expresses a jitter value, and the transverse axis expresses a recording laser power. In addition, Pw/Pwo in the transverse axis indicates the following. "Pwo" is a peak power Pw(p) at which bottom jitter is obtained, and 2T asymmetry is 0%. The laser power "Pw" is adjusted such that a value of Pw(p)/Pw(e) for the peak power Pw(p) and the erasure power Pw(e) at which bottom jitter is obtained is maintained. A value of the transverse axis is a ratio of a laser power "Pw" to a case of Pw/Pwo=1. In addition, in the respective samples, the peak power Pw(p) and the erasure power Pw(e) at which bottom jitter is obtained are as follows.

Comparative example (CuBiAlITO): Pw(p)=9.45 mW and Pw(e)=2.9 mW

Sample 1 (W/Ru): Pw(p)=8.8 mW and Pw(e)=3.2 mW

Sample 2 (W/Zn/Ru): Pw(p)=14.55 mW and Pw(e)=5 mW

Sample 3 (W/Cu/Ru): Pw(p)=13 mW and Pw(e)=4.4 mW

Sample 4 (W/In/Ru): Pw(p)=16.17 mW and Pw(e)=5.45 mW

Sample 5 (W/Sn/Ru): Pw(p)=9.75 mW and Pw(e)=3.7 mW (FIG. 4B: Comparative Example)

In a case of the comparative example sample which is an ITO-based single film, bottom jitter was about 6%, and a power margin which was estimated at a level of jitter 10% was 21%.

(FIG. 4C: Sample 1)

In Sample 1 of the W/Ru single film, it was observed that bottom jitter was reduced to about 5%. In addition, the power margin was 23%. Both of them became more favorable than the comparative example. In addition, although not shown, in a case of the $WO_3$ single layer (that is, Ru is not included), bottom jitter was 9% and thus was not good, and the peak power Pw(p)=30 mW and the sensitivity showed bad results (Pw(p)=8.8 mW in Sample 1). It is considered from the measurement result of Sample 1 that to contain Ru is effective.

(FIG. 5A: Sample 2)

In Sample 2 of W/Zn/Ru single film, bottom jitter was about 5.5% which was favorable, and a power margin was 40% or more which was very favorable. It can be considered that a power margin can be secured without deterioration in bottom jitter as an effect of Zn.

(FIG. 5B: Sample 3)

In Sample 3 of W/Cu/Ru single film, bottom jitter was about 5.5% which was favorable, and a power margin was 28% or more which was a favorable result. It can be considered that a power margin can be secured without deterioration in bottom jitter as an effect of addition of Cu.

(FIG. 6A: Sample 4)

In Sample 4 of W/In/Ru single film, bottom jitter was about 5% which was favorable, and a power margin was 36% or more which was a favorable result. It can be considered that a power margin can be secured without deterioration in bottom jitter as an effect of addition of In.

(FIG. 6B: Sample 5)

In Sample 5 of W/Sn/Ru single film, bottom jitter was about 5% which was favorable, and a power margin was 30% or more which was a favorable result. It can be considered that a power margin can be secured without deterioration in bottom jitter as an effect of addition of Sn.

[3-3: Reliability Verification]

Figure 7:
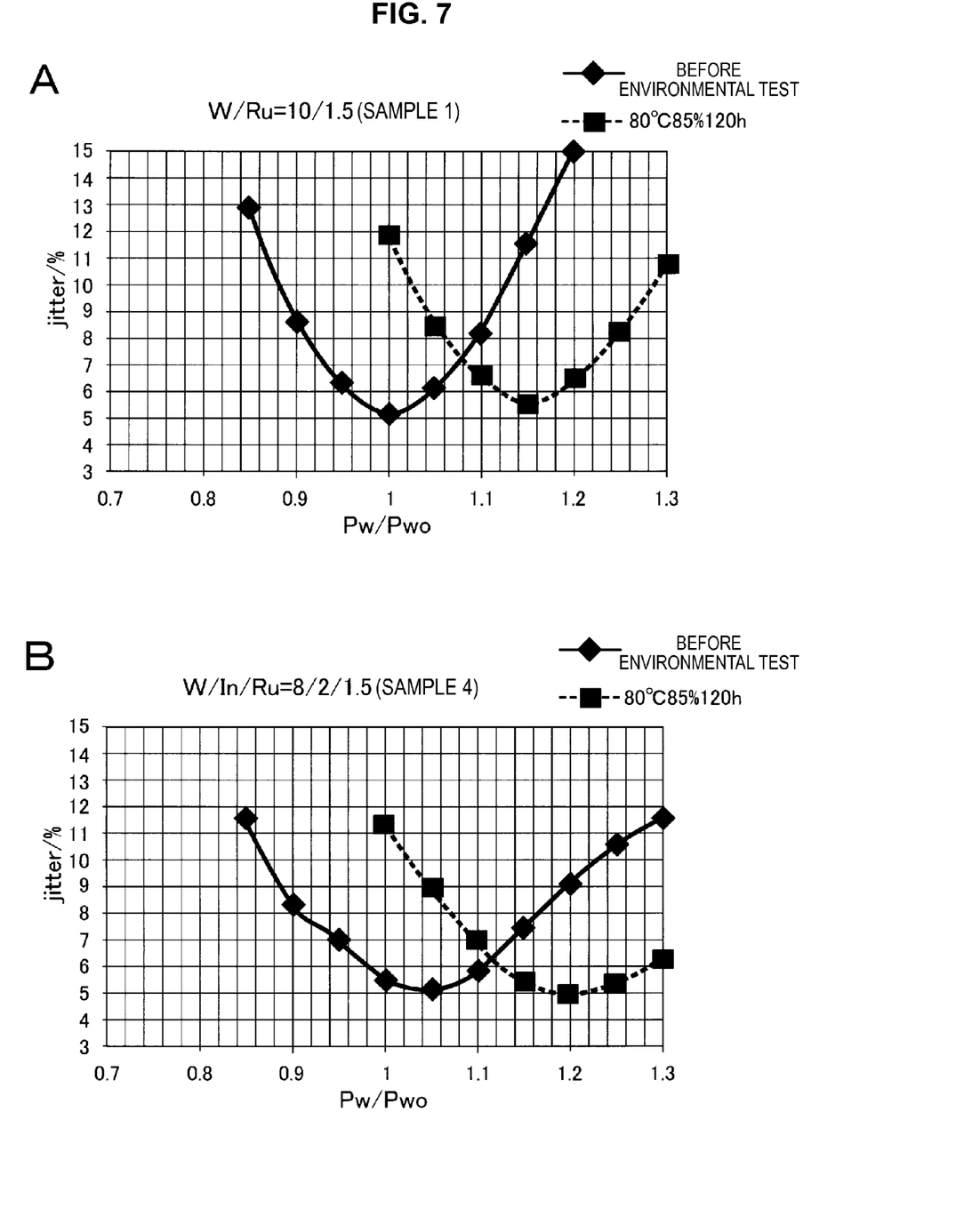
FIGS. 7A and 7B are diagrams illustrating environmental test results of the embodiment.
Figure 8:
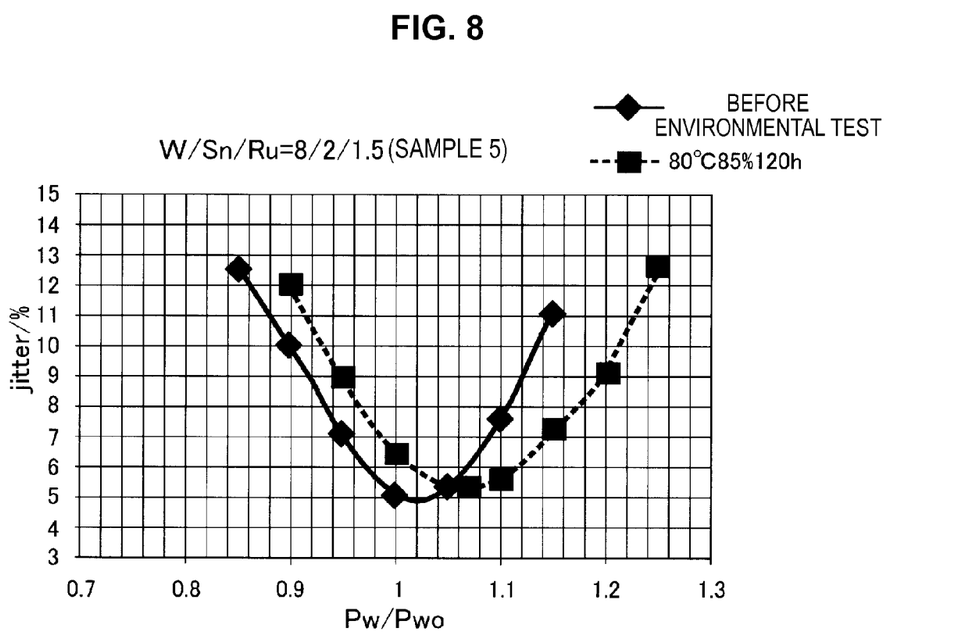
FIG. 8 is a diagram illustrating an environmental test result of the embodiment.

A description will be made of results of performing an environmental test on Samples 1, 4 and 5 with reference to FIGS. 7A, 7B, and 8. The environmental test was performed by measuring jitter before and after a state in which the samples are placed in a thermostatic chamber at temperature of 80° C. and humidity of 85% for 120 hours. FIG. 7A shows a measurement result of Sample 1, FIG. 7B shows a measurement result of Sample 4, and FIG. 8 shows a measurement result of Sample 5. In the respective figures, the solid line indicates a measured value before the environmental test, and the broken line indicates a measured value after the environmental test. The measured value before the environmental test is a value obtained by performing recording and reproduction on an optical disc sample before being placed in the thermostatic chamber and measuring jitter at each laser power. The measured value after the environmental test is a value obtained by performing recording and reproduction on an optical disc sample after being placed in the thermostatic chamber and measuring jitter at each laser power.

The jitter curve for the laser power is seen to be shifted after the environmental test is performed in any sample. The shift amount is about 17% in a case of Sample 1, the shift amount is about 16% in a case of Sample 4, and the shift amount is about 6% in a case of Sample 5. In addition, practically, shift of up to about 20% is allowed by giving environmental conditions. On the other hand, in a case of the information recording layers of ITO (In6 and Sn4), $WO_3$, CuBiAlITO, and the like, the shift amounts are 35% to 125% in the same condition, and considerable deterioration occurs after the environmental test. In contrast, the sample formed of the W/Ru-based single film of the present embodiment is better in terms of sensitivity deviation or bottom jitter than other samples. In addition, reliability is notably improved as in Sample 5 of FIG. 8 by adding Sn.

[3-4: Handling of Optical Recording Density]

Figure 9:
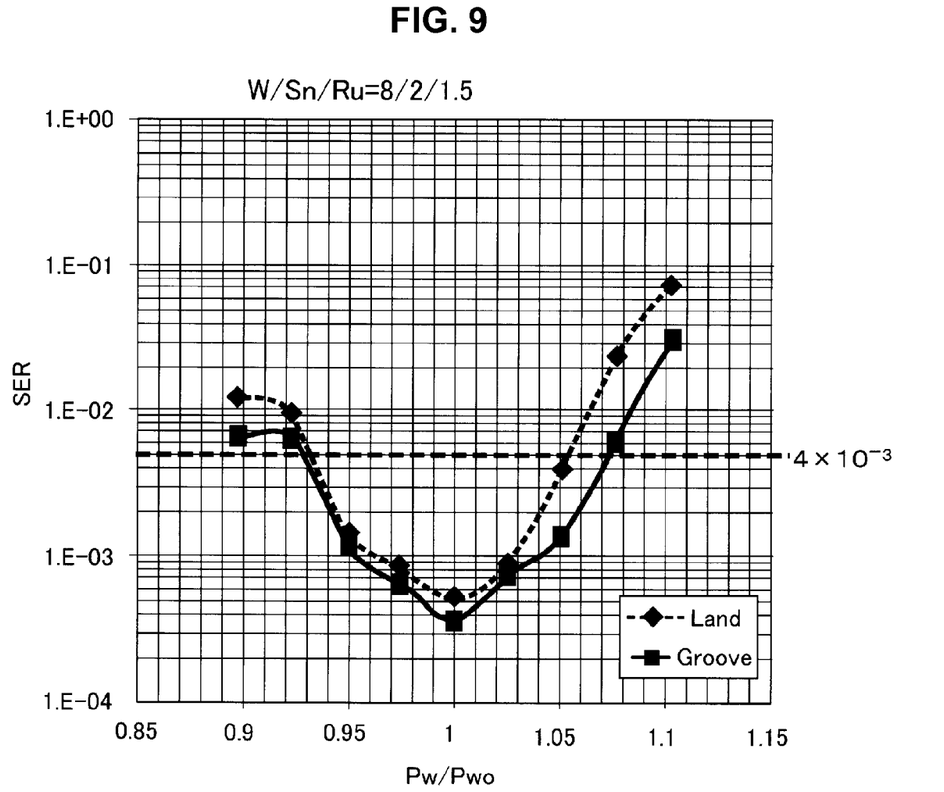
FIG. 9 is a diagram illustrating handling of a high density of the embodiment.

A description will be made of handling of recording at a high linear density with reference to FIG. 9. FIG. 9 shows a result measured using a sample of W/Sn/Ru=8/2/1.5 in the same manner as the above-described Sample 5. However, the surface capacity was 60 GB. In other words, the linear density was 40 GB, a land/groove recording track pitch was 0.225 μm (a half of the groove pitch 0.45 μm in land/groove recording). In addition, the recording linear velocity corresponds to the double velocity of the BD, and the light strategy is (n−1) strategies. In FIG. 9, the transverse axis expresses the above-described Pw/Pwo, and the longitudinal axis expresses SER (Symbol Error Rate). The solid line indicates a measured value in the groove track, and the broken line indicates a measured value in the land track.

As can be seen from FIG. 9, bottom values of SER of both of the land and the groove are put in a range of the power of −4 ($1\times10^{-4}$) which is thus favorable. In addition, when viewed under a criteria ($4\times10^{-3}$) which is an error correctable upper limit value, a power margin of ±6% is obtained.

In addition, in a case of the ITO-based single film (for example, the above-described comparative sample), measurement is difficult at the above-described recording density. As a result of performing test in groove recording at a linear density 36 GB and a track pitch 0.32 μm, a power margin was about ±3%. Therefore, it is considered that the samples of the embodiment are sufficiently suitable for high density recording.

[3-5: Conclusion, and Sn Addition Concentration and Ru Concentration]

As described above, it can be seen that the optical disc of the embodiment can secure a sufficient power margin by using the information recording layer 2 of a W/Ru-based single film, and thereby reliability is improved and high density recording is also sufficiently handled.

Here, in the information recording layer 2, the Ru content ratio is preferably smaller than 30% when elements other than Ru are set to 100. For example, as described with reference to FIG. 4C, an effect achieved by containing Ru is notable, and there are more merits as the Ru content ratio increases. Practically, Ru can be added for W (or W+(X))=100 up to about 30%. In a case where Ru content ratio is 30%, the transmittance is equal to or less than 65%, and thus Ru content ratio is preferably smaller than 30% in order to secure the transmittance. For example, in a case of the multi-layer disc shown in FIGS. 1C and 1D, it is important for the layers L1 to L5 and the like to secure the transmittance, and thus an amount of Ru to be added is preferably suppressed. On the other hand, the information recording layer 2 of a single layer disc or the layer L0 (the innermost information recording layer when viewed from the laser incident surface) of a multi-layer disc is not necessary to have a high transmittance, and thus the Ru content ratio may increase.

Figure 10:
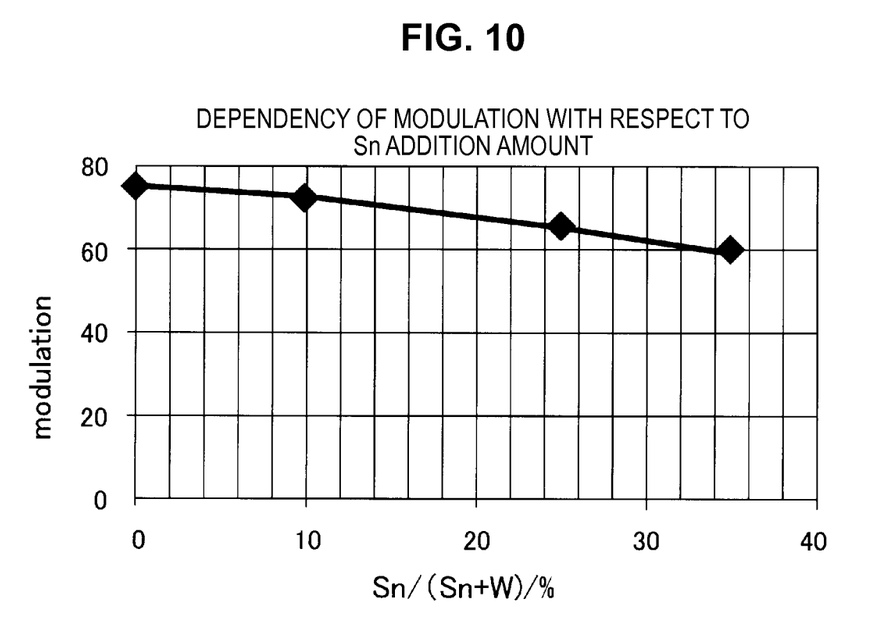
FIG. 10 is a diagram illustrating dependency of modulation with respect to a Sn addition amount.

In addition, although the W/Sn/Ru single film is used as Sample 5, notable characteristics are obtained as shown in FIGS. 6B, 8 and 9 by containing Sn. In a case where the information recording layer 2 employs a single film structure including Sn, the Sn content ratio is preferably smaller than 70% when W+Sn is set to 100. FIG. 10 shows dependency of modulation with respect to a Sn addition amount. As shown in FIG. 10, the modulation decreases as a Sn content ratio increases. This characteristic is considered to be substantially linear, and the modulation is reduced to about 40% when Sn is included in W+Sn by 70% or more. In addition, for example, the modulation of 40% or more is set as the standard of a BD-R single layer disc. Accordingly, the Sn content may be smaller than 70%.

Although the embodiment has been described, a composition and content in the information recording layer 2 is not limited to the above-described examples. Although Samples 2 to 5 have a single film structure with compositions respectively including Zn, Cu, In, Sn in addition to W and Ru, compositions may include two or more of Zn, Cu, In, and Sn in addition to W and Ru. For example, there may be a composition such as W/In/Cu/Ru or a composition such as W/Zn/Cu/Ru. In addition, content ratio of each element is not limited to the examples of the above-described samples.

Additionally, the present application may also be configured as below.

(1) An optical recording medium including:

a substrate;

an information recording layer that is formed on the substrate and has a single film structure formed by an oxide including W and Ru; and a light transmissive layer that is formed on the information recording layer.

(2) The optical recording medium according to (1), wherein the information recording layer further includes at least one of Zn, Sn, In, and Cu.

(3) The optical recording medium according to (1) or (2), wherein a Ru content ratio in the information recording layer is smaller than 30% when an element other than Ru is set to 100.

(4) The optical recording medium according to any one of (1) to (3), wherein the information recording layer contains Sn, and a Sn content ratio is smaller than 70% when W+Sn is set to 100.

(5) The optical recording medium according to any one of (1) to (4), wherein the oxide contains an amount of oxygen which is more than an amount of oxygen in a stoichiometric composition.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical recording medium comprising:
a substrate;
an information recording layer that is formed on the substrate and has a single film structure formed by an oxide including W and Ru; and
a light transmissive layer that is formed on the information recording layer, wherein a Ru content ratio in the information recording layer is smaller than 30% when an element other than Ru is set to 100.

2. An optical recording medium comprising:
a substrate;
an information recording layer that is formed on the substrate and has a single film structure formed by an oxide including W and Ru; and
a light transmissive layer that is formed on the information recording layer, wherein the information recording layer contains Sn, and a Sn content ratio is smaller than 70% when W+Sn is set to 100.

3. An optical recording medium comprising:
a substrate;
an information recording layer that is formed on the substrate and has a single film structure formed by an oxide including W and Ru; and
a light transmissive layer that is formed on the information recording layer, wherein the oxide contains an amount of oxygen which is more than an amount of oxygen in a stoichiometric composition.

4. A method of manufacturing an optical recording medium which includes a substrate, an information recording layer, and a light transmissive layer, the method comprising:
forming the substrate;
forming the information recording layer which has a single film structure formed by an oxide including W and Ru through sputtering on the substrate; and
forming the light transmissive layer on the information recording layer, wherein a Ru content ratio in the information recording layer is smaller than 30% when an element other than Ru is set to 100.

5. A method of manufacturing an optical recording medium which includes a substrate, an information recording layer, and a light transmissive layer, the method comprising:
forming the substrate;
forming the information recording layer which has a single film structure formed by an oxide including W and Ru through sputtering on the substrate; and
forming the light transmissive layer on the information recording layer, wherein the information recording layer contains Sn, and a Sn content ratio is smaller than 70% when W+Sn is set to 100.

6. A method of manufacturing an optical recording medium which includes a substrate, an information recording layer, and a light transmissive layer, the method comprising:
forming the substrate;
forming the information recording layer which has a single film structure formed by an oxide including W and Ru through sputtering on the substrate; and
forming the light transmissive layer on the information recording layer, wherein the oxide contains an amount of oxygen which is more than an amount of oxygen in a stoichiometric composition.

7. The optical recording medium according to claim 1, wherein the information recording layer further includes at least one of Zn, Sn, In, and Cu.

8. The optical recording medium according to claim 2, wherein the information recording layer further includes at least one of Zn, Sn, In, and Cu.

9. The optical recording medium according to claim 3, wherein the information recording layer further includes at least one of Zn, Sn, In, and Cu.

10. The optical recording medium according to claim 4, wherein the information recording layer further includes at least one of Zn, Sn, In, and Cu.

11. The optical recording medium according to claim 5, wherein the information recording layer further includes at least one of Zn, Sn, In, and Cu.

12. The optical recording medium according to claim 6, wherein the information recording layer further includes at least one of Zn, Sn, In, and Cu.

* * * * *